United States Patent Office 3,130,805
Patented Apr. 28, 1964

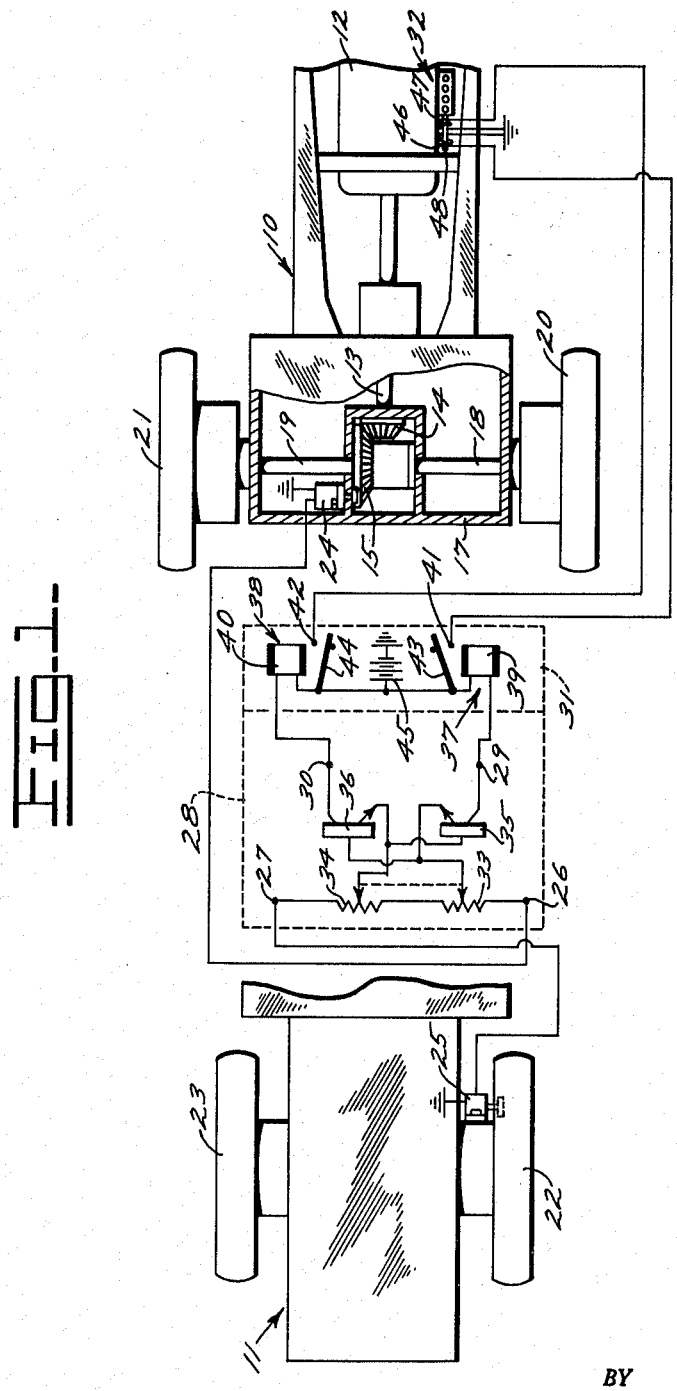

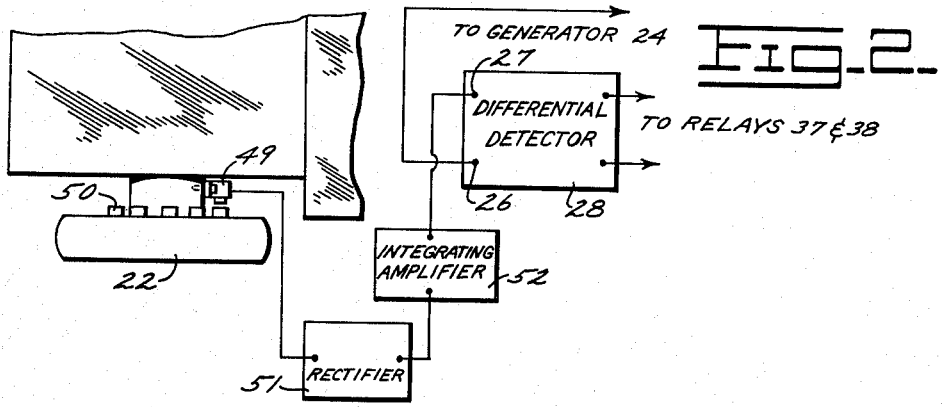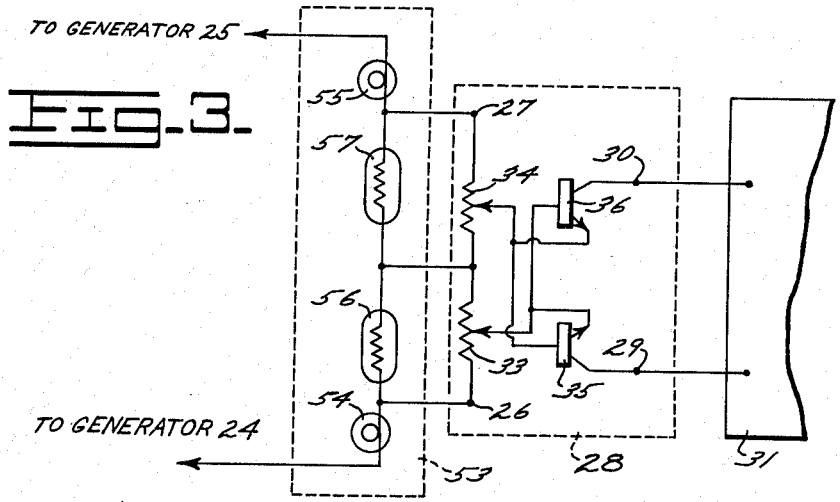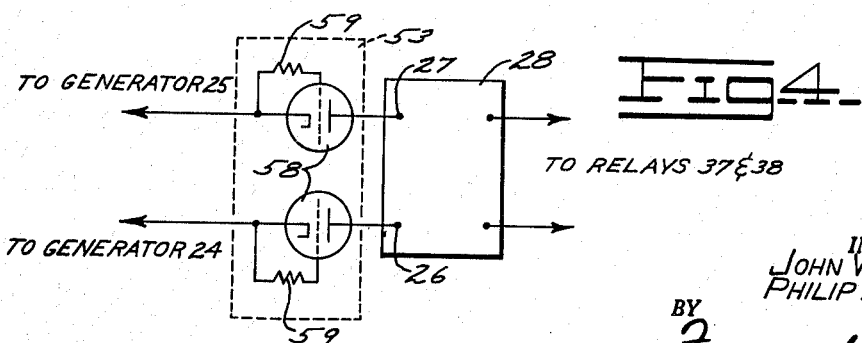

3,130,805
WHEEL SLIP CONTROL FOR TRACTOR-
TRAILER COMBINATIONS
John W. Carter and Philip J. Costa, Peoria, Ill., assignors
to Caterpillar Tractor Co., Peoria, Ill., a corporation of
California
Filed Feb. 27, 1961, Ser. No. 92,047
6 Claims. (Cl. 180—14)

This invention relates to means for controlling the relative speeds of the drive wheels of a tractor or other vehicle and wheels of a trailing unit such as a scraper to prevent excessive slipping or free turning of the pulling vehicle drive wheels when the trailing unit bogs down or encounters resistance beyond the capacity of the former.

Self-powered wheel vehicles are often used in conjunction with trailing units for a variety of purposes, particularly in earth moving applications. A tractor, for example, finds extensive use in earth moving operations as a pulling vehicle for scrapers, wagons, or other trailing units. In such earth moving operations, as well as in other environments, the drive wheels of the pulling vehicle frequently spin or slip as a result of the trailing unit bogging down or presenting increased rolling resistance to the pulling vehicle beyond its tractive capacity. This is particularly prevalent during loading operations conducted with scrapers. The inertia of a scraper during the loading operation frequently exceeds the tractive capacity of the pulling vehicle causing slippage of the drive wheels. As a result of wheel slippage, traction is lost until the speed of the drive wheels is again correlated to that of the trailing unit wheels. Speed correlation and restoration of traction is commonly accomplished by manual adjustment of the vehicle engine throttle setting to reduce the speed of the drive wheels to substantially the speed of the trailing unit wheels. Substantial strain is thereby imposed on the operator in continuously adjusting engine speed to overcome wheel slippage. In addition, human response time is such that substantial wheel slip occurs before the operator can correlate the drive wheel speed to the trailing unit wheel speed. Tire wear is consequently excessive where the solution to the slip problem resides in the operator's control of the pulling vehicle.

It is, therefore, an object of this invention to provide automatic control means for regulating ground speed of the driving wheels of a pulling vehicle to substantially the speed of the wheels of a trailing unit whereby the tractive force of the vehicle drive wheels is continuously correlated to the demands of the trailing unit load.

Another object of the invention is the provision of an electronic wheel slip control which automatically senses and corrects variations between pulling vehicle and trailing unit wheel speeds to prevent excessive wheel slip and tire wear.

Further and more specific objects and advantages of the invention are made apparent in the following specification wherein the invention is described in detail by reference to the accompanying drawings.

In the drawings:

FIG. 1 is a schematic view of the drive wheels and drive system of a pulling vehicle, the wheels of a trailing unit, and an electric circuit which controls the speed of the drive wheels relative to the speed of the trailing unit in accordance with the present invention;

FIG. 2 is a schematic view of a modification to a portion of the circuit of FIG. 1;

FIG. 3 shows a further modification of the circuit sohwn in FIG. 1; and

FIG. 4 shows an alternative embodiment of the circuit of FIG. 3.

Portions of a self-powered vehicle, such as a tractor, are illustrated at 10 coupled by an appropriate hitch (not shown) to a trailing vehicle 11, such as a scraper. The engine 12 of the pulling vehicle imparts power through a drive shaft 13, pinion gear 14 and a bevel drive gear 15 to a conventional differential enclosed within a housing 17. The differential transmits this power to axles 18 and 19 upon which are mounted drive wheels 20 and 21. The tractive power developed at the drive wheels is employed not only to propel the vehicle 10, but to pull the trailing unit 11. The added load of the trailing unit presents a formidable problem in the operation of the pulling vehicle in that the trailing unit may bog down or encounter resistance beyond the tractive capacity of the pulling vehicle and thereby cause the drive wheels 20 and 21 to slip or spin. As mentioned previously the drive wheel slip results in a loss of traction and excessive wear of the drive wheel tires until such time as the vehicle operator reduces the drive wheel speed to substantially equal that of the trailing unit wheels, a pair of which is indicated at 22 and 23. In earth moving operations wherein a variety of pulling vehicle-trailing unit combinations are employed, the cost of tire replacement has been a significant portion of overall operating expense because of this wheel slip problem. The present invention overcomes the problem by correlating the speed of the drive wheels 20, 21 to the speed of the trailing unit wheels 22, 23 automatically and without in any way interfering with the normal action of the pulling vehicle drive system.

In order to detect the relative speed of the pulling vehicle drive wheels 20, 21 and the trailing unit wheels 22, 23, and to detect excessive departures therebetween, a pair of tachometer generators 24 and 25, or equivalent angular velocity transducers, are respectively operatively coupled in driven relation to the drive wheels and trailing unit wheels. The generator 24 is driven by the drive gear 15 in the power train of the vehicle 10 so as to be not influenced by the action of the differential and to indicate by its output current only the relative ground speed of the drive wheels 20, 21. The generator 25 is driven, as by means of a gear train, from one wheel 22 of the trailing unit to provide a reference current indicative of the ground speed of the trailing unit wheels, all wheels thereof being at substantially the same speed. The generators are grounded to the respective vehicle frames and connected to input terminals 26, 27 of a differential voltage detector 28. The detector is arranged to produce a control signal at one or the other of a pair of output terminals 29, 30 when the generator currents and therefore the respective wheel speeds are excessively unbalanced, the output terminal at which the signal appears being indicative of the generator that is producing the greatest current. When the pulling vehicle drive wheel speed exceeds the trailing unit wheel speed by a predetermined amount, a control signal is produced at, for example, terminal 29 whereas for the opposite wheel speed condition a control signal is produced at terminal 30. These output signals in turn control an actuating circuit 31 coupled to the terminals 29, 30. This circuit is arranged to responsively operate engine speed regulating means 32 for decreasing or increasing the speed of the vehicle engine 12, and therefore the speed of the drive wheels, in an opposite sense to an unbalance indicated by the appearance of a control signal at one of the detector terminals 29, 30.

Although a variety of circuits may be employed as the differential detector 28 and actuating circuit 31, a transistorized detector circuit and relay controlled energization circuit of the types disclosed in a copending application of George W. Eger, Jr., et al., Serial No. 842,448, assigned to Caterpillar Tractor Co., a California corporation for a somewhat diverse purpose, are preferred. The differential detector preferably includes a pair of potentiometers 33 and 34 in combination with a pair of transistors 35 and 36. The potentiometers are connected in opposition between the input terminals 26 and 27 with the variable taps thereof ganged and respectively connected to the emitter of transistor 35 and base of transistor 36 and to the base of transistor 35 and emitter of transistor 36. The collectors of transistors 35 and 36 are respectively connected to the terminals 29, 30.

The relay controlled energization circuit that is preferably employed as the actuating circuit 31 comprises a pair of relays 37, 38 which respectively include operating coils 39, 40 and normally open contacts 41, 42 engageable by contactors 43, 44. The contactors 43, 44 and coils 39, 40 are connected respectively to one terminal of a battery 45, or equivalent current source, the other terminal of which is connected to ground. The coils of the respective relays are also connected to the output terminals 29, 30 of the differential detector circuit. When a signal appears at terminal 29, current flows through the relay coil 39 and the contactor 43 engages contact 41 to thereby close a circuit to the battery 45 through the contact. Similarly, the appearance of a signal at detector terminal 30 effects closure of a circuit to the battery through contact 42. The flow of battery current responsively effected by closure of the respective relay contacts is utilized to actuate the engine speed regulating means 32.

The engine speed regulating means 32 may be of any suitable type for selectively effecting a reduction or increase in the speed of the vehicle engine 12 in response to current flow through the contacts of the respective relays 37, 38 of the actuating circuit 31. Preferably the speed regulating means is provided as an electromagnetically operated automatic throttle control which includes a pair of opposed solenoids 46, 47 and control plunger 48 in operative association with the throttle. Energization of solenoid 46 effects movement of the plunger in a direction of decreased throttle setting, whereas energization of solenoid 47 effects plunger movement in the opposite direction of increased throttle setting. Thus energization of solenoid 46 produces a reduction in engine speed and therefore in the speed of the vehicle drive wheels 21, 22. Conversely, energization of solenoid 47 results in an increase of engine and drive wheel speeds. This control of the speed of the vehicle drive wheels is approximately correlated to counteract wheel slip conditions that may exist between the vehicle drive wheels and trailing unit wheels by providing for the energization of the throttle control solenoids 46, 47 from the actuating circuit 31. The inner ends of the opposed solenoids are connected to ground and the outer ends thereof are respectively connected to the contacts 41 and 42 of the actuating circuit relays 37 and 38. When the differential detector circuit 28 detects a drive wheel speed that is significantly greater than the trailing unit wheel speed, the resulting signal produced at terminal 29 effects closure of normally open relay contact 41 in the manner previously described to thereby produce a current flow from battery 45 through throttle control solenoid 46. The vehicle engine speed is automatically reduced as is therefore the drive wheel speed until the drive wheel and trailing unit wheel speeds are substantially equal and a balanced condition is detected by the detector circuit. The signal at terminal 29 then terminates, resulting in opening of contact 41 and deenergization of throttle control solenoid 46. When the opposite wheel speed condition occurs, viz., drive wheel speed significantly less than trailing unit wheel speed, operation of the slip control proceeds in an analogous, but opposite manner to that just described. A signal is now produced at terminal 30 of the detector circuit, resulting in closure of relay contacts 42 and energization of throttle control solenoid 47 with current from battery 45. The plunger 48 is moved in an open throttle direction to thereby increase drive wheel speed into substantial agreement with trailing unit wheel speed. It is thus apparent that the wheel slip control of the present invention operates to continuously maintain vehicle drive wheel speed substantially equal to trailing unit wheel speed and thereby prevent excessive wheel slip and tire wear.

Various modifications are possible in the wheel slip control of the present invention and one such modification is illustrated in FIG. 2. In some instances it is difficult to adapt a tachometer generator for driving by the wheels of the trailing unit. Accordingly, as depicted in the figure, a proximity switch 49 may be utilized in place of the tachometer generator 25 to provide a signal that is indicative of trailing unit wheel speed. The switch may be arranged for actuation by a plurality of equally spaced metallic members 50 carried upon one of the wheels, e.g., the ring of bolts used for securing the wheel to the axle hub. Each time a member passes the switch, the switch is actuated to effect the flow of a current pulse. The number of pulses per unit of time is proportional to wheel speed. In order to convert the pulse rate to a proportional direct current signal of comparable form to the output of tachometer generator 24 and suitable to operate the differential detector circuit, a rectifier 51 and integrating amplifier 52 are connected between the switch and input terminal 27 of the detector circuit. The rectifier and integrating amplifier produce a direct current signal for application to the detector circuit that is proportional to the repetition rate of pulses effected by the proximity switch, and therefore to the trailing unit wheel speed. The sensitivity of the wheel slip control circuit described hereinbefore may be adjusted as desired to meet the requirements of specific terrain and other operating conditions by varying the settings of potentiometers 33, 34. The potentiometer settings determine the minimum voltage differential between the drive wheel and trailing unit wheel speed transducers that will trigger the transistors of the detector circuit and thereby effect a compensatory adjustment of wheel speed differential. In other words the potentiometers facilitate adjustment of the allowable error voltage or speed differential to predetermined fixed values commensurate with average conditions anticipated in a particular operation. Although the sensitivity of the control may be thereby varied to predetermined values that are optimum for a given set of substantially constant conditions, the conditions may significantly vary and be highly irregular during the course of a single operation whereby the sensitivity of the control is not optimum for all phases of the operation. Accordingly, as an extremely advantageous modification to the basic slip control of the invention we have provided sensitivity adjusting means 53 for automatically adjusting the sensitivity of the control in inverse proportion to the ground speed of the vehicle and trailing unit combination as depicted in FIG. 3. Preferably the automatic sensitivity adjusting means 53 is of a type that varies the current flow to the input terminals 26, 27 of the differential detector from the tachometer generators 24, 25 or equivalent transducers in inverse relation to the speeds of the respective rotating wheels with which they are associated. The sensitivity adjusting means 53 may consequently comprise positive coefficient thermistors 54, 55, or equivalent positive coefficient resistors, and negative coefficient thermistors 56, 57, or equivalent negative coefficient resistors, connected in paired series opposition between the outputs of the generators. The junctures between thermistors 54 and 56 and between thermistors 55 and 57 are respectively connected to the input terminals 26, 27 of the detector circuit, whereas the juncture between thermistors 56 and 57 is connected to the juncture between the potentiometers 33, 34. The negative coefficient thermistors 56, 57 are thus respectively in parallel with the potentiometers 33, 34 and the positive coefficient thermistors 54, 55 are in series with the respective parallel combinations thereof. As wheel speed and generator voltage increase, the resistances of the thermistors 54, 55 proportionately increase and the thermistors 56, 57 decrease in resistance to thereby decrease the current flowing into terminals 26, 27 and potentiometers 33, 34. As wheel speed and generator voltage decrease, the thermistor resistances vary in opposite senses to that mentioned above and the current flowing into the detector input terminals increases. Thus the sensitivity of the slip control is automatically reduced at high operating speeds and is increased for closer wheel slip regulation at low speeds.

The automatic sensitivity adjusting means 53 may be alternatively provided as depicted in FIG. 4. As shown therein a pair of triodes 58 are provided with their anodes respectively connected to terminals 26 and 27 and their cathodes respectively connected to the outputs of generators 24 and 25. The control grid of each triode is connected through a resistor 59 to the cathode. Such connection of the control grid to the cathode serves to adjust current flow through the tube in inverse proportion to the generator voltages acting on the triodes and therefore to wheel speed. As the cathode voltage becomes such as to increase or decrease current flow, the grid voltage changes to oppose the change, viz., in a direction to decrease or increase the current flow. The net effect of the triodes is consequently to increase detector sensitivity at low wheel speeds and to decrease sensitivity at high wheel speeds in a similar manner to that previously described relative to the sensitivity adjusting circuit of FIG. 3.

We claim:

1. A system for preventing a wide variance between the wheel speed of a power driven vehicle and the wheel speed of a tandem vehicle motivated thereby, comprising in combination:
 a first transducer on the power driven vehicle which provides an electrical output signal proportional to the wheel speed of the vehicle;
 a second transducer on the tandem vehicle which provides an electrical output signal proportional to the wheel speed of the tandem vehicle;
 an electronic circuit having a pair of inputs and a pair of outputs, each of said inputs connected to receive one of the transducer signals, said electronic circuit responsive to a given difference between transducer signals to provide an output signal at one of said circuit outputs wherein the particular circuit output upon which the output signal appears is dependent upon which transducer signal is greater than the other;
 means associated with the power unit of the vehicle responsive to a signal on one output to reduce the speed at which the wheels are driven and to a signal on the other output to increase the speed at which the wheels are driven; and
 means electrically disposed between said transducers and said electronic circuit for reducing the sensitivity of said electronic circuit to the transducer difference signal as a function of vehicle speed.

2. In a wheel slip detection and control system for a power driven vehicle having at least two wheels which can operate at speeds independent of one another the combination comprising:
 first means associated with one of the independent wheels for providing an electrical signal having a parameter which varies with the speed of that wheel;
 second means associated with the other independent wheel for providing an electrical signal having a parameter which varies with the speed of that wheel;
 electronic circuit means disposed to receive the signals from said first and second means and responsive to a given difference existing between the signals from said means due to one of the wheels slipping to provide an output signal;
 means associated with the power unit of the vehicle responsive to a signal on said circuit means output to vary the operating speed of the power unit; and
 means associated with said electronic circuit means to automatically increase the given difference which must exist between the signals from said first and second means before an output signal will be induced from said electronic circuit means, as vehicle speed increases.

3. The control system of claim 2 wherein said electronic circuit means has two outputs one of which provides a signal when one of the wheels is slipping and the other of which provides a signal when the other wheel is slipping.

4. In a slip control system for use with an engine driven vehicle having power driven wheels and non-power driven wheels, the combination comprising:
 first transducer means associated with the power driven wheels, said transducer means operative to provide an electrical output signal which is a function of the speed of the power driven wheels;
 second transducer means associated with the non-power driven wheels, said transducer means operative to provide an electrical output signal which is a function of the speed of the non-power driven wheels;
 electronic means electrically disposed to receive the output of said first and second transducers and responsive to a difference between the two signals due to the power driven wheels and non-power driven wheels operating at different speeds to provide an output signal;
 means associated with said electronic means operative to increase the signal difference necessary to produce an output at said electronic means with increased vehicle speed; and
 means associated with the engine of the vehicle responsive to an output signal on said electronic means to vary the speed of the engine.

5. The control system of claim 4 wherein said electronic means has two outputs, said electronic means operative to produce a signal at one output when the speed of the non-driven wheels exceeds the speed of the driven wheels sufficiently to produce an output at said electronic means, and operative to provide a signal at the other output when the speed of the power driven wheels exceeds the speed of the non-power driven wheels sufficiently to produce an output signal from the electronic means.

6. The system of claim 5 wherein said means associated with the vehicle engine for regulating the speed thereof is connected to the outputs of said electronic means and responsive to a signal on one output to increase the engine speed and to a signal at the other output to decrease the engine speed.

References Cited in the file of this patent

UNITED STATES PATENTS

| 2,321,059 | Anderson | June 8, 1943 |
| 2,806,149 | Lillquist | Sept. 10, 1957 |
| 2,959,772 | Bruner | Nov. 8, 1960 |
| 3,025,722 | Eger et al. | Mar. 20, 1962 |

FOREIGN PATENTS

| 130,590 | Australia | Dec. 9, 1948 |